(12) United States Patent
Biskupek

(10) Patent No.: US 11,401,702 B2
(45) Date of Patent: Aug. 2, 2022

(54) BACKFLOW PREVENTER AND SYSTEM SEPARATOR ESPECIALLY FOR FIRE-FIGHTING APPLICATIONS

(71) Applicant: AWG Fittings GmbH, Ballendorf (DE)

(72) Inventor: Lars Biskupek, Oelde (DE)

(73) Assignee: AWG Fittings GmbH, Ballendorf (DE)

( * ) Notice: Subject to any disclaimer, the term of this patent is extended or adjusted under 35 U.S.C. 154(b) by 0 days.

(21) Appl. No.: 17/268,913

(22) PCT Filed: Sep. 2, 2019

(86) PCT No.: PCT/EP2019/073328
§ 371 (c)(1),
(2) Date: Feb. 16, 2021

(87) PCT Pub. No.: WO2020/048913
PCT Pub. Date: Mar. 12, 2020

(65) Prior Publication Data
US 2021/0238830 A1 Aug. 5, 2021

(30) Foreign Application Priority Data
Sep. 3, 2018 (DE) .......................... 102018214948.8

(51) Int. Cl.
*E03B 7/07* (2006.01)
*F16K 15/06* (2006.01)

(52) U.S. Cl.
CPC ............ *E03B 7/077* (2013.01); *F16K 15/066* (2013.01); *Y10T 137/2544* (2015.04);
(Continued)

(58) Field of Classification Search
CPC .. E03B 7/077; F16K 15/066; Y10T 137/2544; Y10T 137/2557;
(Continued)

(56) References Cited

U.S. PATENT DOCUMENTS

| 976,010 | A | 11/1910 | Thompson |
| 1,356,298 | A | 10/1920 | McGregor |

(Continued)

FOREIGN PATENT DOCUMENTS

| CN | 101018971 A | 8/2007 |
| CN | 104235441 A | 12/2014 |

(Continued)

OTHER PUBLICATIONS

PCT International Preliminary Report dated May 19, 2020 for PCT/EP2019/073328.
(Continued)

*Primary Examiner* — Kevin F Murphy
(74) *Attorney, Agent, or Firm* — Farjami & Farjami LLP

(57) ABSTRACT

There is provided a system separator having a backflow preventer including a housing enclosing a main flow conduit, a valve seat inside the housing on the main flow conduit, and a valve body movable relative to the valve seat to close off the main flow conduit together with the valve seat in a closed position and to release the main flow conduit in an open position. The valve body is alternately movable between the closed position and the open position by at least one of a pressure difference in the main flow conduit or a force of a spring element, and the main flow conduit is divided in the area of the valve body into at least one outer flow conduit and one inner flow conduit, and the valve body encloses the inner flow conduit and forms at least one valve-body valve seat on the inner flow conduit.

15 Claims, 11 Drawing Sheets

(52) U.S. Cl.
CPC .... *Y10T 137/2557* (2015.04); *Y10T 137/2612* (2015.04); *Y10T 137/2615* (2015.04); *Y10T 137/2617* (2015.04); *Y10T 137/7841* (2015.04)

(58) Field of Classification Search
CPC ......... Y10T 137/2612; Y10T 137/2615; Y10T 137/2617; Y10T 137/7841
See application file for complete search history.

(56) References Cited

U.S. PATENT DOCUMENTS

| | | | |
|---|---|---|---|
| 1,677,357 A | | 5/1924 | McGregor |
| 3,025,869 A | * | 3/1962 | Kenfield ............. F16K 17/0433 137/102 |
| 3,070,112 A | * | 12/1962 | Fricke ................... F16K 15/18 137/102 |
| 3,515,163 A | * | 6/1970 | Freeman ............. A61M 16/208 137/102 |
| 3,967,635 A | * | 7/1976 | Sealfon ............... B01F 3/04815 137/102 |
| 4,941,502 A | * | 7/1990 | Loos ........................ B60N 2/36 137/115.05 |
| 5,176,171 A | * | 1/1993 | Andersson ............ F16K 15/063 137/512.1 |
| 7,114,516 B2 | * | 10/2006 | Ito .......................... F16K 15/066 137/487.5 |
| 8,281,866 B2 | * | 10/2012 | Tessier ................... E21B 34/08 166/373 |
| 10,781,662 B2 | * | 9/2020 | Andersson .............. E21B 34/08 |

FOREIGN PATENT DOCUMENTS

| | | |
|---|---|---|
| DE | 1550254 A1 | 7/1969 |
| DE | 204278 A1 | 11/1983 |
| DE | 3532180 C1 | 4/1987 |
| DE | 20 2017 107 759 U1 | 3/2018 |
| DE | 20 2018 102 598 U1 | 7/2018 |
| DE | 20 2018 102 599 U1 | 7/2018 |
| DE | 10 2017 007 458 A1 | 2/2019 |
| EP | 1 972 839 A2 | 9/2008 |
| EP | 1 801 298 B1 | 6/2012 |
| EP | 2 592 393 A1 | 5/2013 |

OTHER PUBLICATIONS

PCT International Search Report dated Dec. 3, 2019 for PCT/EP2019/073328.

* cited by examiner

BACKFLOW PREVENTER AND SYSTEM SEPARATOR ESPECIALLY FOR FIRE-FIGHTING APPLICATIONS

This is a U.S. national phase application, which is based on, and claims priority from, PCT application Serial No. PCT/EP2019/073328, filed Sep. 2, 2019, which is based on, and claims priority from German Patent Application Serial No. DE 102018214948.8, filed Sep. 3, 2018, which are hereby incorporated by reference into the present application.

The present invention relates to a backflow preventer and a system separator comprising such a backflow preventer, in particular for fire-fighting applications. Generic backflow preventers are disclosed, for example, in DE 20 2018 102 598 U1 and DE 20 2018 102 599 U1. These are largely tubular in design, extend from an inlet to an outlet and, for their use as system separators, further have a plurality of discharge openings positioned distributed over the circumference and connected to the outlet in such a way that, when the inlet is sealed, water can flow out of the outlet into the environment via the discharge openings. To prevent the discharged water from splashing freely radially outward, a splash protection ring is provided which covers the discharge openings at a distance radially outward.

The generic backflow preventers have a pot-like valve body that is displaced by a spring element to a position sealing the inlet when the inlet-side pressure is not above the outlet-side pressure by a predetermined amount. The valve body, when displaced to its closed position, simultaneously releases the discharge openings in the housing.

A disadvantage of the known backflow preventers is that the pot-like valve body covers a large part of the main flow conduit and thus a large flow loss is generated in the main flow conduit. On the one hand, this results in a large differential pressure between the inlet-side pressure and the outlet-side pressure at which the backflow preventer opens the main flow conduit, and on the other hand, even when the backflow preventer is fully open, there is a comparatively high pressure drop between the inlet-side pressure and the outlet-side pressure and the flow is reduced.

Another disadvantage of the type of backflow preventer is that the release of the discharge openings and the closing of the inlet are effected with one and the same valve body, which accordingly has a large and complicated design.

The shape of the valve body with a radial extension and the necessary flow cross-section radially outside the valve body require a housing with a large outer diameter, which is why the backflow preventer cannot be gripped with one hand and is relatively heavy. The splash protection ring provided results in an axial extension of the backflow preventer and thus also contributes to a high weight.

Other backflow preventers are disclosed in EP 1 801 298 B1, DE 35 32 180 C1, DD 204 278 A and DE 20 2017 107 759 U1.

The present invention is based on the object of improving a backflow preventer of the generic type in such a way that a comparatively small differential pressure between the inlet-side pressure and the outlet-side pressure is sufficient to open the backflow preventer, the pressure loss is low and a weight-reduced and compact design is possible.

The object according to the invention is solved by a backflow preventer with the features of claim 1. In the dependent claims, particularly advantageous designs of the backflow preventer as well as a system separator with a backflow preventer according to the invention are indicated.

A backflow preventer according to the invention, which is particularly suitable for fire-fighting use, has a housing which encloses a main flow conduit. Further, a valve seat is provided which is positioned within the housing at the main flow conduit.

A valve body is movable relative to the valve seat in order to close off the main flow conduit together with the valve seat in a closed position and to open the main flow conduit in an open position. In the closed position, the valve body is in corresponding sealing contact with the valve seat, and in the open position, the valve body is correspondingly lifted from the valve seat and together with the latter delimits a flow cross-section.

The valve body can be moved alternately between its closed position and its open position by a pressure difference in the main flow conduit, in particular between an inlet and outlet thereof, and/or by the force of a spring element. The spring element can be designed, for example, as a compression spring which presses the valve body elastically in the direction of the inlet, so that to open the backflow preventer, i.e. to release the main flow conduit, the pressure difference between the outlet and inlet of the main flow conduit must be overcome on the one hand and the force of the spring element on the other.

According to the invention, the main flow conduit in the area of the valve body is divided into at least one outer flow conduit and one inner flow conduit and the valve body encloses the inner flow conduit. Furthermore, the valve body forms at least one valve-body valve seat at the inner flow conduit, wherein this inner valve-body valve seat is provided in addition to the previously mentioned valve seat. The valve body has at least one primary and one secondary valve disk, wherein the primary and the secondary valve disk are arranged in such a way that in the closed position the primary valve disk sealingly abuts the valve seat on the main flow conduit and the secondary valve disk sealingly abuts the valve-body valve seat on the inner flow conduit, and in the open position, the primary valve disk is lifted from the valve seat on the main flow conduit and releases the outer flow conduit, and the secondary valve disk is lifted from the valve-body valve seat on the inner flow conduit and releases the inner flow conduit.

Due to the at least two-part embodiment of the valve body, the medium can therefore flow from the inlet through the outer flow conduit and the inner flow conduit to the outlet in parallel in the open position of the valve body, whereby a comparatively large overall flow conduit is available and pressure losses are avoided. Furthermore, this design allows a slim embodiment of the housing, which can thus be gripped by a firefighter with one hand in particular.

In particular, the backflow preventer according to the invention already opens when the pressure on the inlet side is 0.2 bar above the pressure on the outlet side.

In addition to the backflow preventer described here, a system separator according to the invention has, in addition to an inlet and an outlet which are connected to each other in a flow-conducting manner via the main flow conduit in the open state of the backflow preventer, i.e. when the valve body is in its open position, a discharge outlet in the housing which is connected to the outlet in a flow-conducting manner in the closed position of the valve body and is sealed off from the main flow conduit in the open position of the valve body.

Preferably, the valve body comprises a valve rod which supports the primary valve disk and on which the secondary valve disk is slidingly positioned. In particular, the primary valve disk is rigidly connected to the valve rod, for example at a front end thereof. According to one embodiment, the valve rod has a first collar with which it abuts against a first stop in the housing in the open position, and the secondary valve disk or a sleeve connected to it and sliding on the valve rod has a second collar with which the secondary valve disk or the sleeve abuts against a second stop in the housing or on the valve rod in the open position.

According to another embodiment of the invention, the first collar is provided on the primary valve disk and the primary valve disk accordingly strikes a first stop in the housing when it is in its maximum open position. The stop in the housing can be formed, for example, by radial struts or radial bolts distributed around the circumference of the housing. The second collar and the second stop can be designed in particular as shown previously.

According to a particularly preferable embodiment of the invention, the housing extends tubularly along a longitudinal axis from an inlet to an outlet and the valve body is displaceable with its valve disks along the longitudinal axis and extends in particular concentrically to the longitudinal axis.

The primary and secondary valve disks can have a disk shape with a comparatively small extension in the direction of the longitudinal axis. However, the term valve disk does not exclude that the extension in the direction of the longitudinal axis may also be larger, and may even be larger than the extension in the radial direction. Preferably, however, the extension in the radial direction is a multiple or several times the extension in the longitudinal direction.

In particular, the housing is provided with a fire-fighting coupling at the inlet and at the outlet, wherein a fire-fighting connection coupling or pressure coupling with a rotatable lug part is advantageously provided at the inlet, and a fire-fighting fixed coupling is advantageously provided at the outlet, for example for connecting a fire hose. With the fire-fighting coupling at the inlet, in particular the fire-fighting connection coupling/pressure coupling, the backflow preventer can be fixed, for example, to a standpipe or a hydrant. The fire-fighting fixed coupling is, for example, screwed to the housing, in particular screwed tightly onto an external thread at the end of the housing. Such fire-fighting couplings are designed, for example, as bayonet coupling halves and advantageously as symmetrical hermaphrodite couplings.

The valve rod can, for example, be mounted in a star-shaped bearing support or in a bearing rim in the main flow conduit. For example, a bearing ring is provided which encloses the valve rod and in which the valve rod is displaceable in the direction of the longitudinal axis, and the bearing ring is held in the main flow conduit by radial struts, for example three or four radial struts, which are designed in particular integrally with the housing. However, it is also possible that the bearing ring and/or the radial struts are a separate part within the housing.

According to a particularly preferred embodiment of the invention, a flow conduit is provided in the radial struts, in particular for forming a discharge outlet, as will be described further below in connection with a system separator. Such a flow conduit can be selectively opened and closed, for example, by the valve rod and/or the sleeve sliding on the valve rod and connected to the secondary valve disk. The valve rod and the sleeve, respectively, thus serve as a valve body, in particular a discharge-outlet valve body, for opening and closing the discharge outlet.

A radial seal is preferably provided, i.e. the valve seat and/or the valve-body valve seat is/are formed by a radially inwardly directed circumferential surface, against which the primary valve disk or the secondary valve disk then sealingly abuts with a radially outwardly directed circumferential surface or a sealing ring, for example an O-ring, provided there.

The system separator according to the invention can, for example, have a sliding sleeve provided in the housing which, on the one hand, forms the valve seat on the main flow conduit and can be displaced in the housing in the direction of a direction of movement of the valve body, in particular in the direction of the longitudinal axis, between a drain position, in which it releases the outlet, and a sealing position, in which it seals off the outlet from the main flow conduit. Thus, in addition to forming the valve seat, the sliding sleeve also fulfills the function of a further sealing body for closing and releasing the discharge outlet.

According to another embodiment of a system separator according to the invention, which can also be implemented independently of the other details presented here and in particular also with a valve body that is not multi-part in design, a valve rod or a sleeve connected to a valve body or valve disk and sliding on a rod forms a discharge-outlet valve body, as explained, which can selectively release and seal the discharge outlet, which is provided in particular in one or more radial struts in the housing.

The discharge outlet is preferably designed in the form of at least one radial bore in the housing, for example in a housing wall or at least one radial strut. In particular, several radial bores are positioned at a distance from each other around the circumference of the housing. The shape of such radial bores is not limited to a circular cross-section. For example, an elliptical, angular or the cross-section of an oblong hole may also be considered. It is also not absolutely necessary for the radial bores to be introduced vertically into the housing. Oblique bores are also possible.

In a sliding sleeve design, the sliding sleeve may be slidably disposed along an inner surface of the housing and have on its radially outer surface a longitudinal section sealed with respect to the inlet and with respect to the outlet and slidable over the at least one radial bore to seal the discharge outlet. In order to release the outlet, the sealed longitudinal section is correspondingly brought into a position in the longitudinal direction beyond the outlet, viewed from the discharge outlet side of the main flow conduit, so that the discharge outlet is connected in a flow-conducting manner to the outlet of the main flow conduit or of the housing.

The sliding sleeve encloses the main flow conduit according to a preferred embodiment of the invention.

Preferably, the sliding sleeve with its radially outer surface, in particular an axial section of its radially outer surface positioned adjacent to the sealed longitudinal section, together with a radially inner surface of the housing delimits a discharge conduit to the discharge outlet. This allows fluid from the outlet to flow radially outwardly along the sliding sleeve to the discharge outlet when the sliding sleeve is in a drain position. The drain position may also be referred to as the discharge position. On the other hand, when the sliding sleeve is in the sealing position, the sealed longitudinal section, which is then positioned in the direction of the longitudinal axis between the discharge outlet and the outlet, blocks the flow path to the discharge outlet.

According to a particularly preferred embodiment of the invention, the discharge outlet is covered at a distance in the radial direction by the rotatable lug part of the fire-fighting connection coupling. Thus, the lug part, which can be rotated to connect the fire-fighting connection coupling, for example, to a standpipe or to a hydrant or also to a hose or a pump, at the same time forms a splash protection ring, which prevents a wide free radial splash over the discharge outlet, in particular the at least one radial bore in the housing. Since no separate splash protection ring has to be provided, the extension of the system separator or the housing in the longitudinal direction can be reduced and weight can be saved.

The aforementioned embodiment with use of the rotatable lug part as a splash protection ring can also be implemented independently of the design of the valve body with several valve disks. Thus, an embodiment with a single valve disk or valve body can also be considered and the further features presented here are optionally applicable.

Instead of the lug part, an axial projection on the housing can also cover the at least one discharge outlet in the radial direction at a distance.

In particular, if the sliding sleeve can be moved into the drain position (discharge position) by the valve body abutting the valve seat, i.e. the valve body actuates the sliding sleeve via the valve seat, it is ensured that the inlet is always reliably sealed before the discharge outlet is opened or released, i.e. connected to the outlet.

The backflow preventer or system separator according to the invention can be used, for example, to effectively prevent contaminated water from flowing back into a drinking water pipeline network if, for example, during fire-fighting operations or in the fire-fighting area in which the backflow preventer or system separator is connected to the outlet of a standpipe or hydrant, there is a risk that extinguishing water from the fire hose can get back into the drinking water pipeline network via the standpipe or hydrant, for example via an underground hydrant to which the standpipe is connected. The danger exists, for example, if a firefighter inadvertently feeds water into a standpipe or hydrant by, for example, mistakenly coupling a hose connected to a discharge side of the pump to the standpipe or hydrant, respectively. In this case, when the pump is switched on, if the pressure at the inlet of the backflow preventer is not at least 0.2 bar above the pressure at the outlet of the backflow preventer, backflow of water from the outlet to the inlet is prevented by the valve body in its closed position, and the water fed into the backflow preventer via the outlet advantageously passes through the discharge outlet into the open air, thus signaling that a fault has occurred.

However, as soon as a pressure of approx. 0.2 bar above the outlet pressure is applied on the inlet side, the discharge outlet is closed. Only when this is completely closed and the pressure is further increased on the inlet side does the valve body preferably begin to move into its open position to release the main flow conduit.

Due to the at least two-part valve body with the primary valve disk and the secondary valve disk, which are preferably axially displaceable relative to each other and which seal against each other, the first valve disk as viewed in the direction of flow, i.e. the primary valve disk, first opens and entrains the secondary valve disk. When the pressure increases further or immediately afterwards, the secondary valve disk is lifted off the primary valve disk in the direction of flow and opens up the inner flow conduit. This allows medium, in particular water, to flow first from the inlet via the outer flow conduit and then additionally via the inner flow conduit to the outlet.

In practice, the two valve disks can open almost simultaneously, so that no switching is noticeable.

The design according to the invention allows the internal diameter of the housing to be made significantly smaller, with the same or lower pressure loss compared to a conventional integral valve disk. It is conceivable to further increase the number of valve disks that seal against each other and together form the valve body, for example to three, four or five. However, this requires many seals and additional parts, and the axial length of the housing becomes greater.

The fire-fighting connection coupling on the input side can be designed, for example, as a Storz B coupling. Its diameter is standardized, as is the diameter of the fire-fighting coupling on the outlet side. Due to the possible slim design of the housing, it can have an outer diameter that is smaller than the outer diameter of the fire-fighting couplings over the entire axial length of the housing. This avoids major constrictions in the housing and thus in the main flow conduit, which increase flow resistance.

The backflow preventer according to the invention can have a pressure drop of maximum 1 bar at a flow rate of 1200 liters per minute or more, in particular 1600 liters per minute or more.

The outer diameter of the housing can, for example, be a maximum of 120 mm, in particular a maximum of 100 mm. Such a diameter can be gripped relatively well with one hand even with firefighters' gloves, but not the conventional diameters of 130 to 140 mm or more. This means, for example, that a carrying handle on the housing can be omitted, which in turn leads to weight advantages.

On the inlet side, a screen can advantageously be provided in the housing. This can be removable from the housing. For example, the screen can be inserted at an angle into an annular groove inside the housing, pivoted into an orientation perpendicular to the longitudinal axis and then secured in an interlocking manner in the housing by rotation. For example, the screen is rotated through 90° for this purpose. The webs of the screen can be designed with a width perpendicular to the flow direction smaller than or equal to 1 mm in order to reduce the pressure loss. According to one embodiment, the screen is made of a spring steel by laser cutting.

Preferably, the screen is provided with at least one radial projection, in particular two radial projections arranged opposite to each other, and the housing is provided with a plurality of axial grooves which adjoin the annular groove inside the housing, referred to herein as the circumferential groove, in such a way that the screen with its at least one radial projection can be inserted into the circumferential groove through at least one of the axial grooves and can be positively locked in the circumferential groove in the housing by twisting. The axial grooves are provided at a distance from one another in the circumferential direction inside the housing, wherein according to one embodiment more axial grooves are provided one behind the other in the circumferential direction than radial projections are provided on the screen. Thus, as will be explained below, the axial grooves can simultaneously serve as an internal drive. Of course, this is also possible if the number of axial grooves corresponds to the number of radial projections. The housing can have several parts connected in series in the longitudinal direction, which are sealed against each other and secured against disengagement, for example, by set screws or the like that engage in radially outer recesses. This makes the housing easy to dismantle and reassemble.

For example, a demountable inlet section of the housing carries the sliding sleeve, the fire-fighting connection coupling and, in particular, the screen. A separate outlet part of the housing can then carry, for example, the valve rod with the valve disks and the fire-fighting coupling at the outlet.

In particular, the demountable inlet section, which is screwed into the outlet part, for example, has the axial grooves shown previously, via which the screen can be inserted into the circumferential groove. Thus, the axial grooves can simultaneously serve as an internal drive for screwing the inlet section into or onto the outlet part, with a corresponding tool provided with radial projections that engages in the axial grooves. The design of the screen shown here, and in particular of the housing with the circumferential groove and the axial grooves cooperating with the radial projection or projections of the screen, can also be implemented independently of the design of the backflow preventer with a multi-part valve body and the other features shown here, and can be used in another system separator or another pipe or another fitting, in particular for fire-fighting use, i.e. in the fire-fighting sector. In particular, use in transition pieces or coupling pieces, hydrants or standpipes may be considered.

The invention will be described below by way of exemplary embodiments and the figures, wherein.

Figure 1:
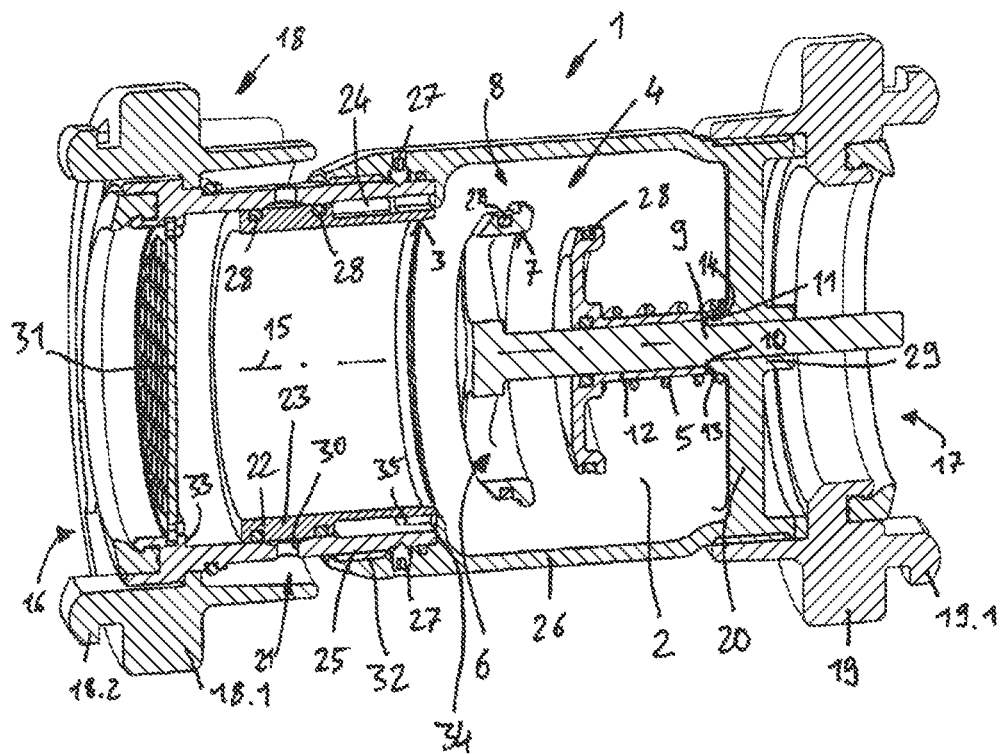
FIG. 1 shows a cross-section through a system separator having a backflow preventer according to the invention.

FIG. 1 shows a system separator for use in the fire-fighting sector, comprising a housing 1 composed of an inlet section 25 and an outlet part 26. In the exemplary embodiment shown, the outlet part 26 comprises a collar projecting radially inwards, against which the inlet section 25 inserted into the outlet part 26 abuts at the end face in the direction of the longitudinal axis 15. In order to block extraction of the inlet section 25 from the outlet part 26, the inlet section 25 has a radially outer circumferential groove, in particular a V-groove, in which screws 27, which are screwed into the outlet part 26, engage. In the exemplary embodiment, the screws 27 are designed as grub screws with internal drive such as internal hexagon or internal star drive, but this is not mandatory. Deviating from the illustration, the outlet part 26 could correspondingly also be inserted into the inlet section 25 and fixed therein.

In the area of the inlet 16, the inlet section 25 carries a fire-fighting connection coupling 18 with a rotatable lug part 18.1. The lugs 18.2 protrude from the front side.

A fire-fighting fixed coupling 19 is screwed onto the outlet part 26 in the area of the outlet 17. This also has protruding lugs 19.1 on the end face.

The inlet 16 is connected to the outlet 17 via the main flow conduit 2 in a flow-conducting manner when the valve body 4 is in the open position shown in FIG. 1. In this open position, medium, in particular water, can flow from the inlet 16 via the inner flow conduit 6 and the outer flow conduit 8 of the main flow conduit 2 to the outlet 17.

The valve body 4 comprises a primary valve disk 4.1 and a secondary valve disk 4.2. In the exemplary embodiment shown, the valve body 4 consists of these two valve disks 4.1, 4.2. However, this is not mandatory. Rather, further valve disks could be provided. The primary valve disk 4.1 seals against the valve seat 3, the secondary valve disk 4.2 seals against the valve-body valve seat 7, in each case in the closed position of the valve body 4 or the respective valve disks 4.1, 4.2. The seal is a radial seal. Each valve disk 4.1, 4.2 carries an O-ring 28 on a radially outer circumferential surface, which is inserted in a circumferential groove and effects the seal.

The outer flow conduit 8 is released when the primary valve disk 4.1 is lifted from the valve seat 3, and the inner flow conduit 6, which is enclosed by the primary valve disk 4.1, is released when the secondary valve disk 4.2 is lifted from the valve-body valve seat 7.

A valve rod 9 is mounted in the housing 1 via a bearing cross 20 so as to be displaceable in the direction of the longitudinal axis 15, which rod carries the primary valve disk 4.1 at one end face and on which the secondary valve disk 4.2 is mounted so as to be displaceable. For this purpose, the secondary valve disk 4.2 has a sleeve 12 that encloses the valve rod 9.

The secondary valve disk 4.2 or its sleeve 12 is moved into the open position against the force of the spring element 5 until the sleeve 12 strikes the second stop 14 with a second collar 13. In the open position, the primary valve disk 4.1 strikes with a first collar 10 against the first stop 11, wherein in the exemplary embodiment shown, the first stop 11 and the second stop 14 are formed by a common end face of the ring 29, which is supported in the bearing cross 20 and encloses the valve rod 9.

The inlet section 25 has a discharge outlet 21 in the form of a plurality of radial holes 30 distributed around the circumference. On an inner surface of the housing 1, in this case of the inlet section 25, a sliding sleeve 22 slides, which serves to optionally seal the discharge outlet 21. For this purpose, the sliding sleeve 22 has a sealed longitudinal section 23 which can be selectively slid over the discharge outlet 21, here the radial bores 30. The sealed longitudinal section 23 is in turn sealed by O-rings 28 to the housing 1 and the inlet section 25, respectively.

Axially adjacent to the sealed longitudinal section 23, a discharge conduit 24 is delimited by the sliding sleeve 22 and the housing 1, in this case the inlet section 25. In a discharge position of the sliding sleeve 22, in which the sealed longitudinal section 23 clears the discharge conduit 24, medium, in particular water, can flow through this channel from the outlet 17 into the discharge conduit 24.

In the inlet 16, a screen 31 is inserted into the housing 1, here the inlet section 25. Its meshes are smaller than the radius of the inner flow conduit 6 and the outer flow conduit 8, i.e. than the extension of the corresponding annular gaps in the radial direction.

Particularly preferably, as shown in the figures, the rotatable lug part 18.1 covers the discharge outlet 21, in particular the radial bores 30, at a distance in the radial direction and thus forms a splash protection ring. Medium spraying out of the discharge outlet 21, in particular water, is therefore deflected by the rotatable lug part 18.1 and emerges at least essentially axially from the space between rotatable lug part 18.1 and housing 1. To ensure a particularly secure hold, the inlet section 25 may be screwed into (or onto) the outlet part 26, see the thread 32. The screws 27 may be provided with security against loosening.

Stops are provided on both sides of the housing 1 for the sliding sleeve 22. In the exemplary embodiment shown, one stop 33 is formed by the area of the housing 1 or the inlet section 25 that carries the screen 31, and the other stop 34 is formed by the radial projection against which the inlet section 25 also abuts. For this purpose, projections 35 are provided on the outside of the sliding sleeve 22, which are also particularly evident from the illustration in FIG. 6, and which abut against the stop 34. In the exemplary embodiment shown, a plurality of projections are provided spaced around the circumference of the sliding sleeve 22 so that the remaining spaces between the projections form or clear the discharge conduit 24.

Figure 2:
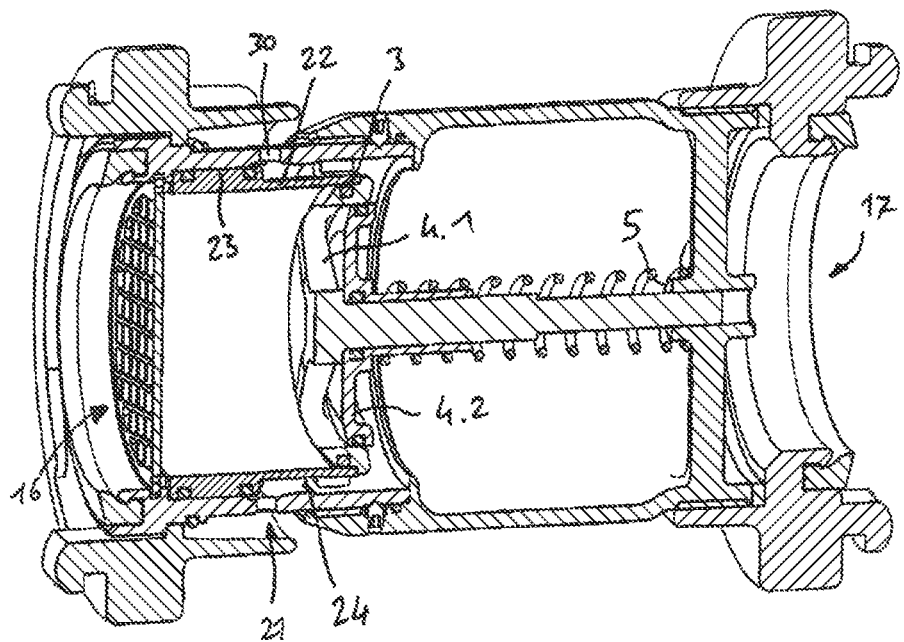
FIG. 2 shows the system separator in the depressurized state.

In FIG. 2, the system separator is shown in the depressurized state, in which the spring element 5 presses the secondary valve disk 4.2 in a sealing manner against the primary valve disk 4.1 and said disk in a sealing manner against the valve seat 3 inside in the sliding sleeve 22 and the sliding sleeve 22 over the primary valve disk 4.1, which in addition to the radial seal abuts against it in the axial direction, into the discharge position, in which the sealed longitudinal section 23 is positioned beyond the discharge outlet 21 or the radial bores 30, as viewed from the outlet 17. Thus, medium, in particular water, can flow from the outlet 17 via the discharge conduit 24 into the discharge outlet 21.

Figure 3:
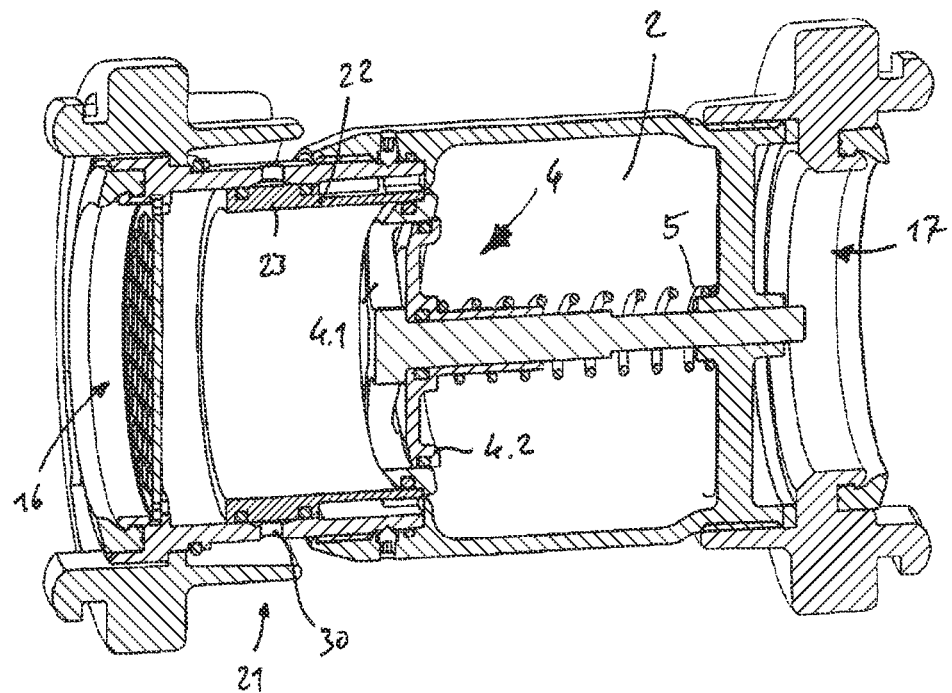
FIG. 3 shows the system separator immediately before opening the primary valve disk.

In FIG. 3, the state is shown in which the sealed longitudinal section 23 has been pushed over the discharge outlet 21 or the radial bores 30 against the force of the spring element 5 due to a corresponding pressure difference between the inlet 16 and the outlet 17, and the valve body 4, i.e. the primary valve disk 4.1 and the secondary valve disk 4.2, is/are, however, still in the closed position, so that the main flow conduit 2 is still closed. At the same time, the discharge outlet 21 is closed.

Figure 4:
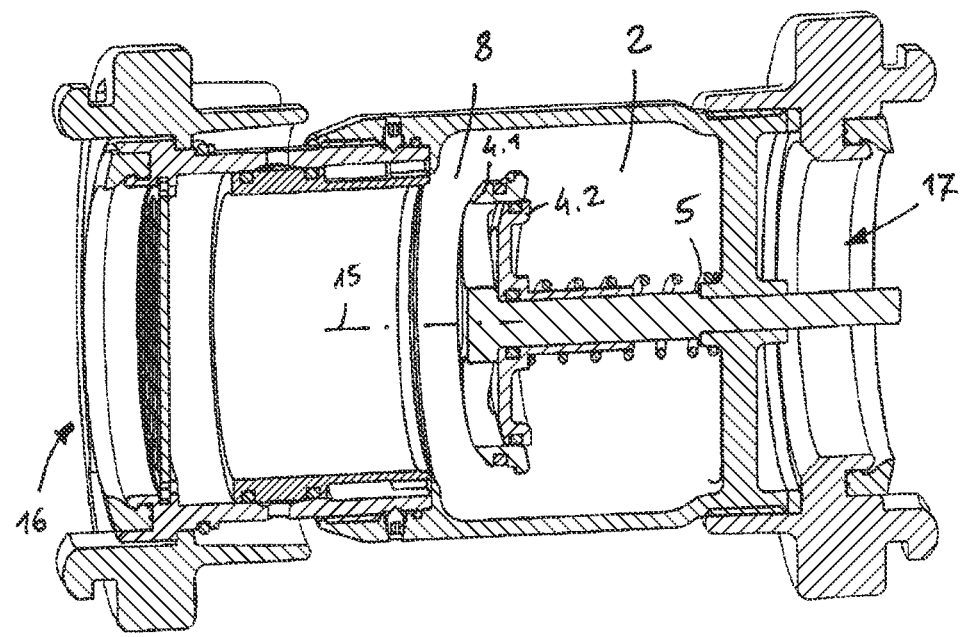
FIG. 4 shows the system separator with the primary valve disk open and the secondary valve disk still closed.

In the position according to FIG. 4, the pressure difference between the inlet 16 and the outlet 17 is still somewhat greater, so that now also the primary valve disk 4.1 and with it the secondary valve disk 4.2 have been displaced along the longitudinal axis 15 in the direction of the outlet 17 against the force of the spring element 5, so that the main flow conduit 2 or its outer flow conduit 8 is open.

Figure 5:
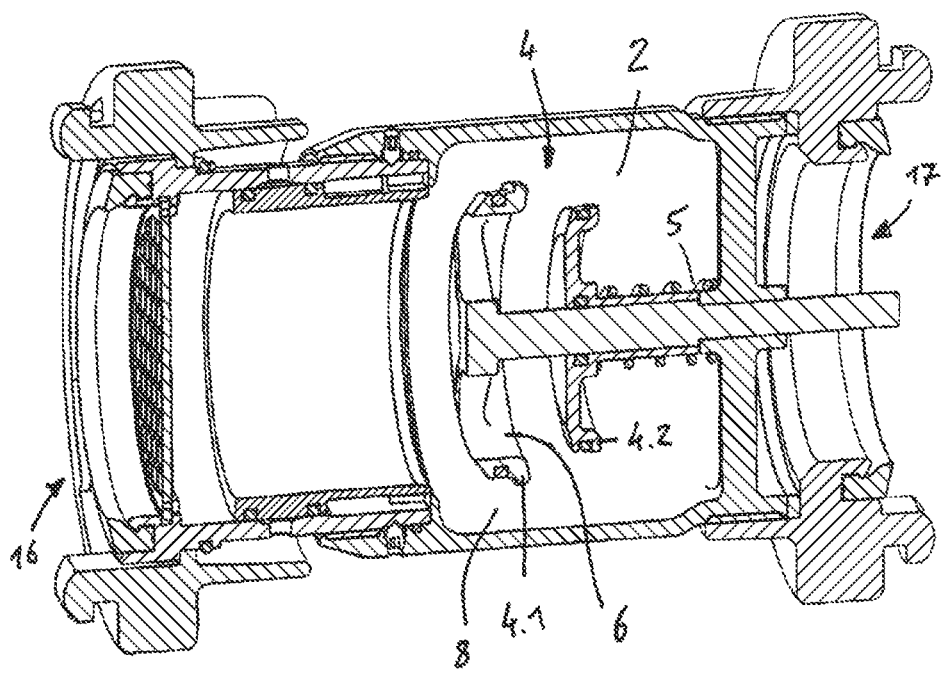
FIG. 5 shows the system separator with the primary and secondary valve disks open.

Immediately thereafter, with a further pressure increase, the position of the system separator reached in FIG. 5 is achieved in that additionally the secondary valve disk 4.2 is lifted from the primary valve disk 4.1 against the force of the spring element 5, so that also the inner flow conduit 6 is open, which was previously still closed. Thus, the valve body 4 is in its open position and medium, in particular water, can flow from the inlet 16 to the outlet 17 without any great pressure loss.

Figure 6:
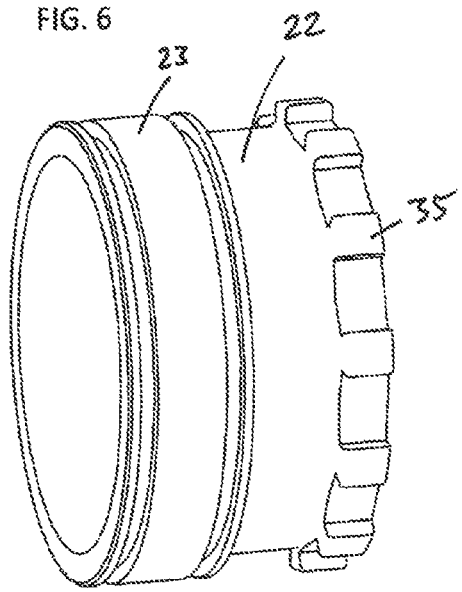
FIG. 6 shows an exemplary embodiment of a sliding sleeve.

FIG. 6 shows the sliding sleeve 22. The sealed longitudinal section 23 (here without the O-rings) and the projections 35 are shown, which slide radially inward on the housing 1 and the inlet section 25, respectively (see the previous figures), and strike the end face of the stop 34 (see FIG. 1) when the sliding sleeve 22 is in the sealing position.

Figure 7:
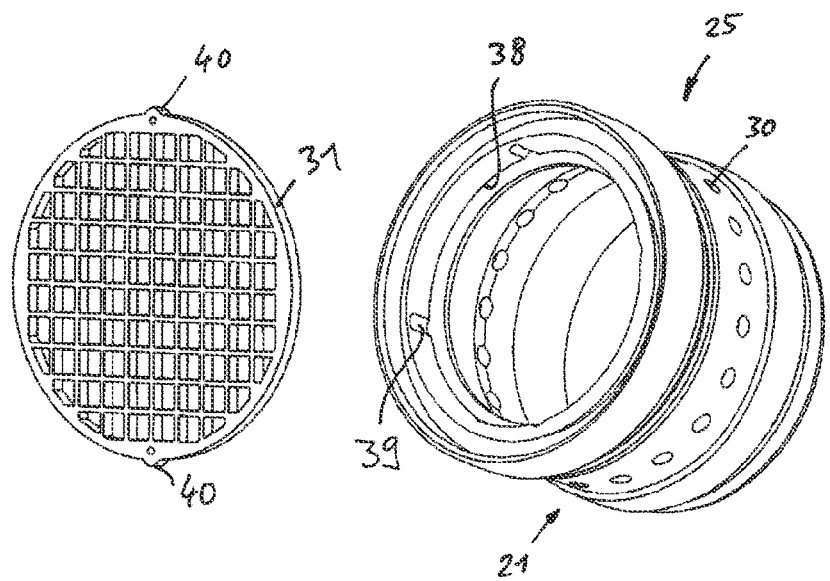
FIG. 7 shows an exemplary embodiment of an inlet section of the housing and a screen.

In FIG. 7, the inlet section 25 is shown. One can particularly recognize the radial bores 30 which form the discharge outlet 21. In the area of the orifices of the radial bores 30 radially inwardly in the inlet section 25, or more generally in the housing 1 (see, for example, FIG. 1), a recess can be provided in the surface which allows the discharge outlet 21 to open smoothly when the sliding sleeve 22 is displaced. In particular, all surface areas along which the sliding sleeve 22 slides are free of sharp edges by providing corresponding radii.

In the exemplary embodiment shown, in accordance with an aspect of the present invention that can also be carried out independently of the other features shown here, the inlet section 25 (or generally a housing 1) has an inner circumferential groove 38 into which the screen 31 can be inserted. The screen 31 has at least one, in this case two, radial projections 40 which serve to positively lock the screen 31 in the inlet section 25 or, more generally, in the housing 1. In order that the radial projections 40 can be inserted into the circumferential groove 38, axial grooves 39 are provided in the inlet section 25, generally the housing 1, immediately adjacent to the circumferential groove 38, through which the screen 31 with its radial projections 40 can be pushed in the direction of the longitudinal axis 15 (see the FIG. 1) until the radial projections 40 are located within the circumferential groove 38.

Subsequently, the screen 31 can be rotated within the circumferential groove 38 so that the radial projections 40 are positively held in the circumferential groove 38 against being pulled out in the direction of the longitudinal axis 15.

The axial grooves 39 can at the same time serve as an internal drive for a diametrically opposed tool, with which the inlet section 25 can be screwed into or onto the outlet part 26 (see FIG. 1).

Figure 8:
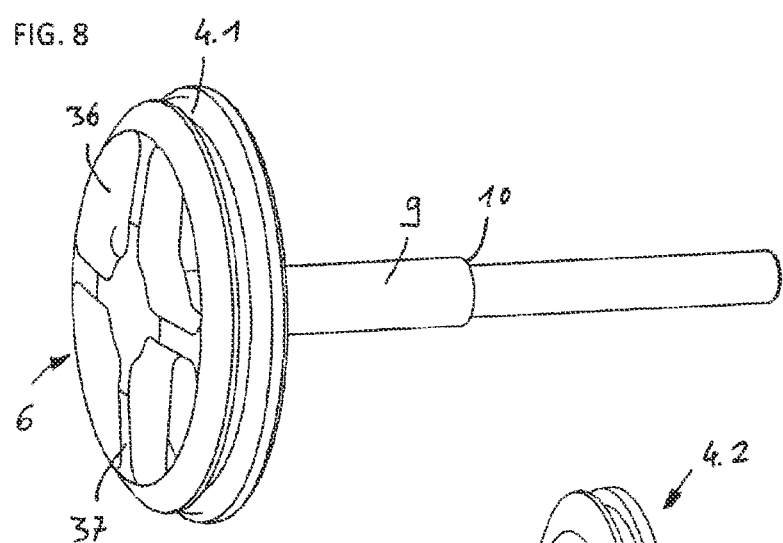
FIG. 8 shows an exemplary embodiment of a primary valve disk.

FIG. 8 shows the primary valve disk 4.1 with the valve rod 9. One can see the first collar 10, with which the valve rod 9 in the open position abuts the housing 1, here the ring 29, see FIG. 1. Furthermore, one can see openings 36 in the valve disk 4.1, which form the inner flow conduit 6. In the exemplary embodiment shown, the primary valve disk 4.1 has spokes 37 between which the openings 36 are arranged in the circumferential direction.

Figure 9:
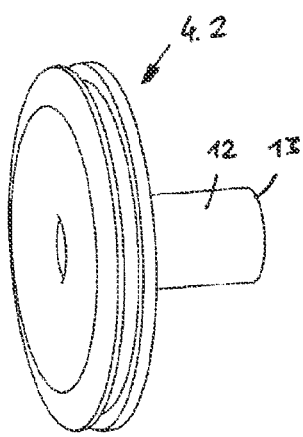
FIG. 9 shows an exemplary embodiment of a secondary valve disk.

FIG. 9 shows the secondary valve disk 4.2, which comprises the sleeve 12. The sleeve 12 has the second collar 13 on the end face, with which the secondary valve disk 4.2 or the sleeve 12 strikes the second stop 14, see FIG. 1, when the valve body 4 or the secondary valve disk 4.2 is in the open position.

Figure 10:
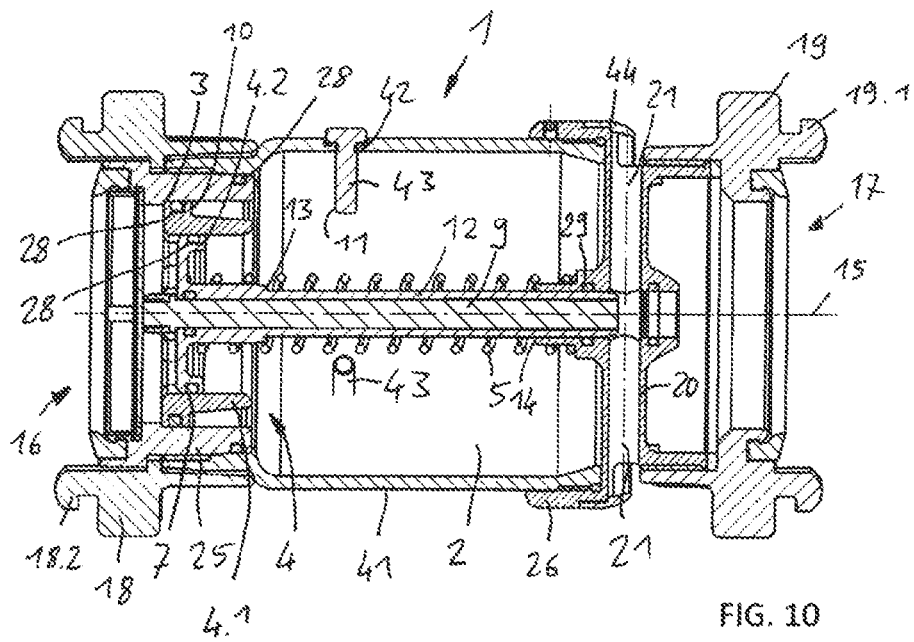
FIG. 10 shows a cross-section through a system separator according to a further exemplary embodiment.

FIG. 10 shows a further exemplary embodiment of a system separator for use in the fire-fighting sector. The corresponding components are marked with the corresponding reference numerals as described in FIGS. 1 to 9. In the following, the differences to the previously illustrated embodiment are essentially discussed.

Figure 18:
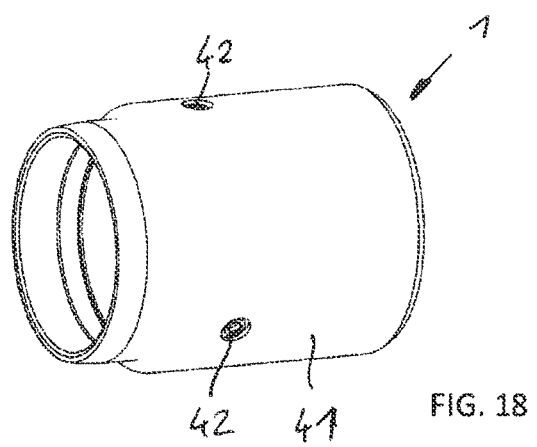
FIG. 18 shows a tubular housing part of the system separator from FIG. 10.

The housing 1 again comprises an inlet section 25 and an outlet part 26. The inlet section 25 and the outlet part 26 are connected to each other via a center part 41. The center part is tubular and is shown as a single part in FIG. 18.

In the exemplary embodiment shown, the center part 41 has threaded holes 42 distributed around its circumference, into which radially aligned screws 43 can be screwed, forming the first stop 11, as will be explained later.

The inlet section 25, for example, is screwed into the center part 41 and in turn carries a fire-fighting connection coupling 18.

A fire-fighting fixed coupling 19 is again screwed onto the outlet part 26 in the area of the outlet 17.

Figure 11:
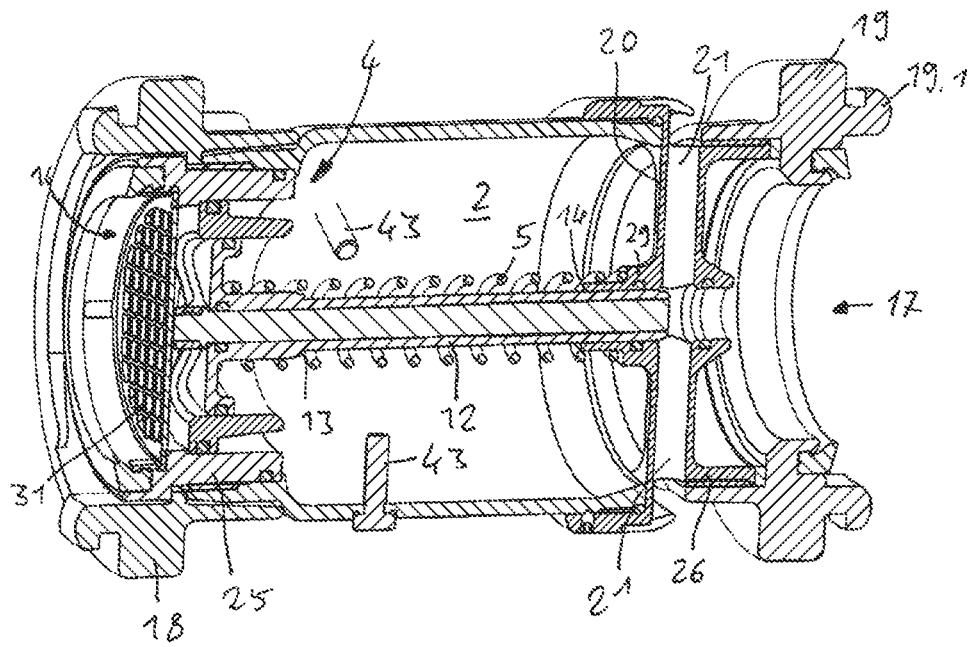
FIG. 11 shows a perspective view of the system separator from FIG. 10 in a depressurized state.

In the state shown in FIGS. 10 and 11, the main flow conduit 2 is closed and thus the inlet 16 is separated from the outlet 17 in a pressure-tight manner because the valve body 4 is in its closed position. The valve body 4 again consists of or comprises the two valve disks 4.1, 4.2. The primary valve disk 4.1 seals against the valve seat 3, the secondary valve disk 4.2 seals against the valve-body valve seat 7. Preferably, a radial seal is provided in each case.

In contrast to the previously illustrated exemplary embodiment, the valve seat 3 is implemented in a stationary component of the housing 1, namely in the inlet section 25. Furthermore, the first collar 10, which abuts against the first stop 11, is not formed on the valve rod 9, but on the primary valve disk 4.1.

In the exemplary embodiment shown, the second collar 13 is again provided on a sleeve 12 which is connected to the secondary valve disk 4.2. However, the sleeve 12 has another function, as will be explained below, and therefore extends in the direction of the longitudinal axis 15 from the secondary valve disk 4.2 beyond the second collar 13.

The second collar 13 in turn strikes against the second stop 14, which is formed by an end face of the ring 29 carried in the bearing cross 20 and enclosing the valve rod 9. Since the bearing cross 20 in the exemplary embodiment shown has only two radial struts, which are aligned with each other, for example, see in particular the illustrations in FIGS. 22 and 23, the bearing cross could also be more appropriately referred to as a bearing rim.

The bearing cross/bearing rim 20 is part of the outlet part 26. A particular feature in this embodiment is that the discharge outlet 21 is formed in the radial struts of the bearing cross/bearing rim 20. The sleeve 12 serves as a discharge-outlet valve body to selectively close the discharge outlet 21. In the position shown in FIGS. 10 and 11, the discharge-outlet valve body, i.e. the sleeve 12, releases the discharge outlet 21 so that medium can flow into the discharge outlet 21 from the main flow passage 2 and the outlet 17, respectively.

Figure 24:
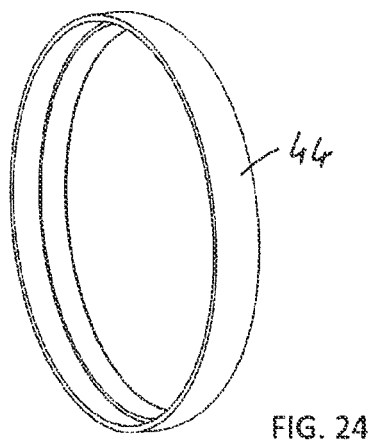
FIG. 24 shows a reflective ring that can be applied to the outside of the housing.

In order to avoid a radially wide splashing of the medium emerging from the discharge outlet 21, an axial projection is provided on the outlet part 26, which covers the discharge outlet 21 at a distance in the radial direction. In the exemplary embodiment shown, this axial projection is formed by a reflection ring 44 which is pushed onto the outlet part 26. FIG. 24 again shows the reflection ring 44 as an individual part. However, the reflection ring 44 could also be designed as a single piece with the outlet part 26. In the exemplary embodiment according to FIGS. 10 and 11, the release and closing of the discharge outlet 21 is thus rigidly coupled to the movement of the valve body 4 and the secondary valve disk 4.2, respectively, wherein the secondary valve disk 4.2 also moves when the primary valve disk 4.1 is displaced, so that the release and the closing of the discharge outlet 21, respectively, is preferably also rigidly coupled to the movement of the primary valve disk 4.1.

Closing the outlet 21 is preferably also rigidly coupled to the movement of the primary valve disk 4.1.

In the position in FIGS. 10 and 11, as shown, the discharge outlet 21 is open and the system separator is at rest, without any pressure.

Figure 12:
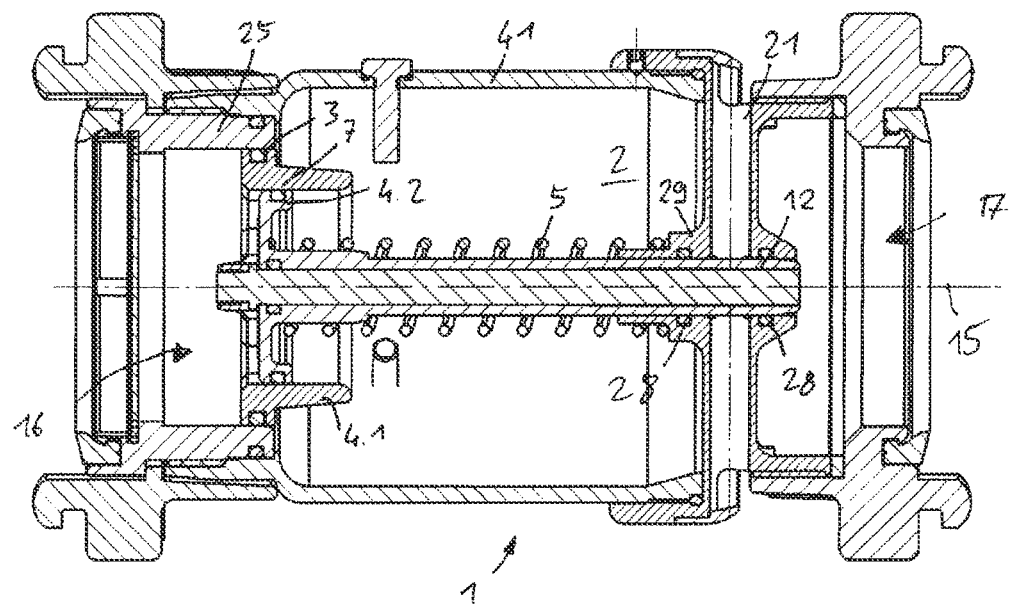
FIG. 12 shows the system separator from FIG. 10 immediately before opening the primary valve disk.
Figure 13:
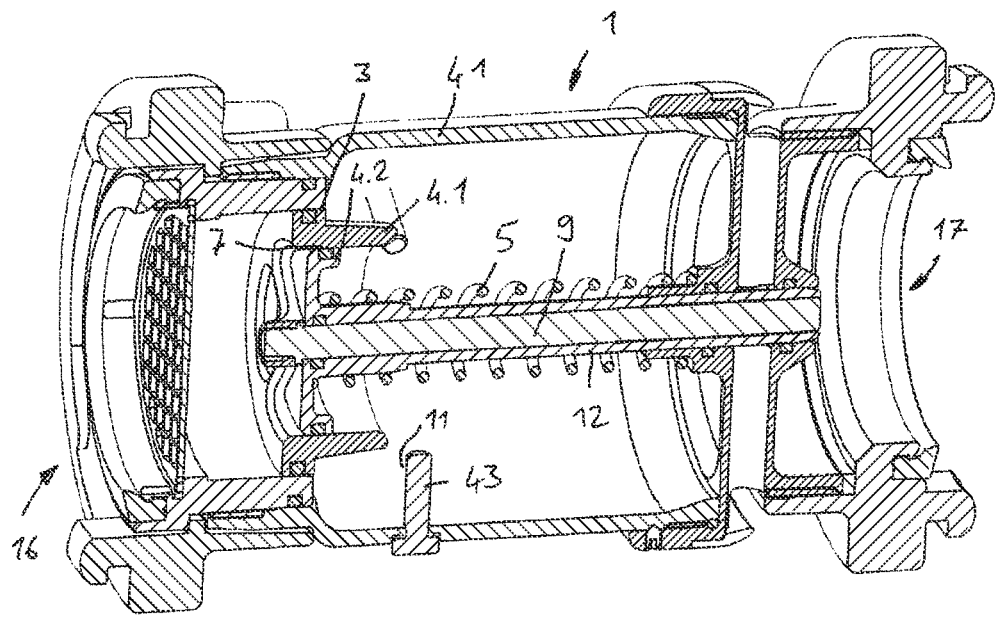
FIG. 13 shows the system separator from FIG. 12 in perspective view.

In the state shown in FIGS. 12 and 13, the discharge outlet 21 is closed because the primary valve disk 4.1 and with it the secondary valve disk 4.2 with its sleeve 12 has moved against the force of the spring element 5 and thus the sleeve 12 has been pushed in a sealed manner in front of the orifice of the discharge outlet 21 in the main flow conduit 2. In the exemplary embodiment shown, sealing is achieved by O-rings 28 inserted axially into the ring 29 on both sides of the discharge outlet 21.

Preferably, the inner surface of the ring 29 into which the discharge outlet 21 opens, at least in the axial section along which the sleeve 12 slides, is free of sharp edges and, in particular, is designed with exclusively flat surfaces and/or radii in the direction of the longitudinal axis 15.

Preferably, the orifice of the discharge outlet 21 is provided with a radius in the sense of a radial extension of the discharge outlet 21 in order to avoid pressure surges when releasing or closing the discharge outlet 21.

The secondary valve disk 4.2 is still in sealing contact with the valve-body valve seat 7, the primary valve disk 4.1 is still just in contact with the valve seat 3.

For example, in the state shown in FIGS. 12 and 13, there is a pressure of about 0.5 bar at the inlet 16, whereas the outlet 17 is pressureless.

Figure 14:
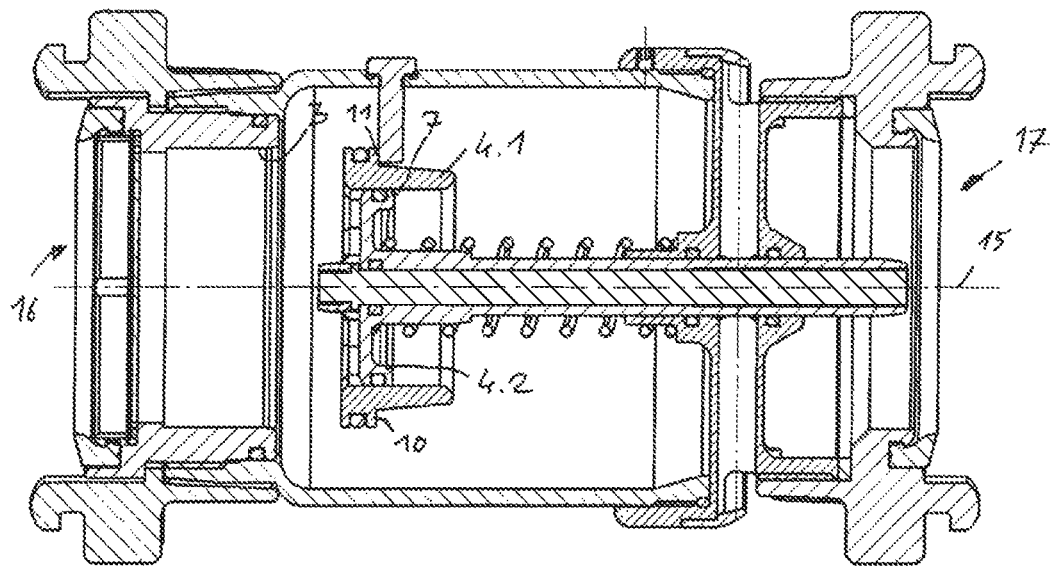
FIG. 14 shows the system separator from FIG. 10 with opened primary valve disk and secondary valve disk still closed.
Figure 15:
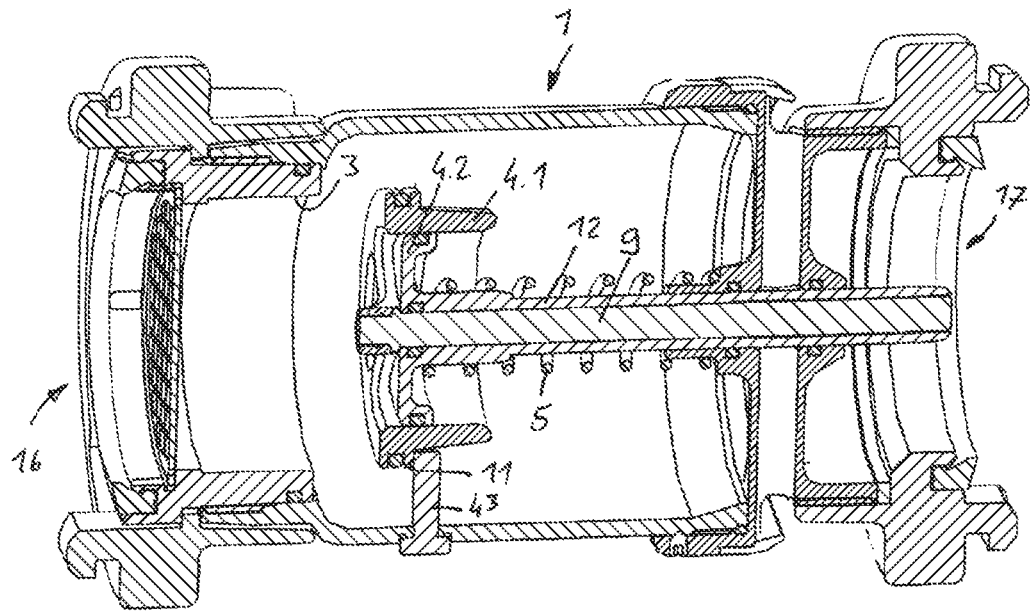
FIG. 15 shows the system separator from FIG. 14 in perspective view.

In the state shown in FIGS. 14 and 15, the pressure in the inlet 16 or the pressure difference between the inlet 16 and the outlet 17 is so great that the primary valve disk 4.1 has been lifted off the valve seat 3 to a maximum and its first collar 10 abuts against the first stop 11. The secondary valve disk 4.2, on the other hand, still sits in a sealing manner on the valve-body valve seat 7.

The discharge outlet 21 is closed.

Figure 16:
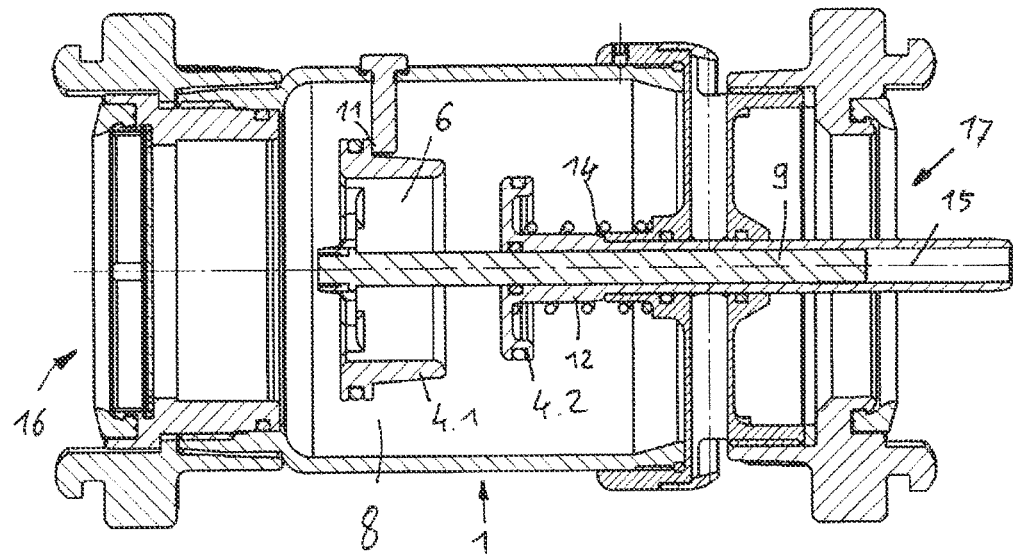
FIG. 16 shows the system separator from FIG. 10 with open primary and secondary valve disk.
Figure 17:
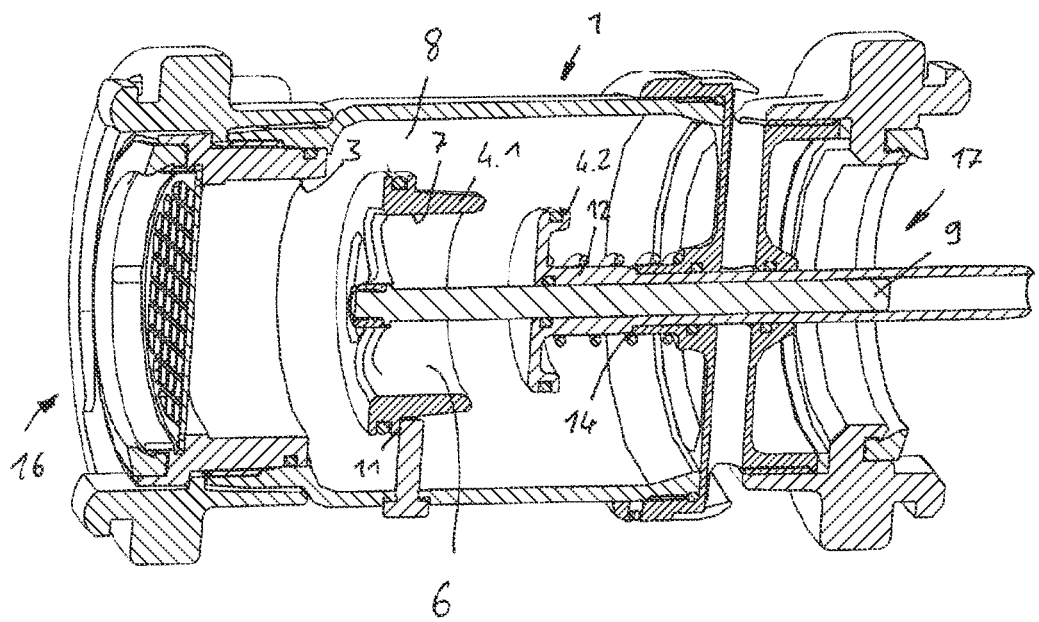
FIG. 17 shows the system separator from FIG. 16 in perspective view.

In the state shown in FIGS. 16 and 17, the system separator is fully open, i.e. the primary valve disk 4.1 and the secondary valve disk 4.2 are lifted to the maximum from their valve seat 3 and valve-body valve seat 7, respectively, and each strike the stop 11, 14 assigned to them. The maximum medium flow rate can flow through the main flow conduit 2, namely through the inner flow conduit 6 and the outer flow conduit 8.

Figure 19:
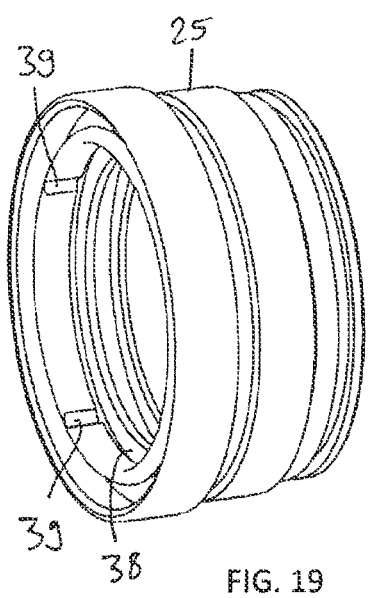
FIG. 19 shows a possible inlet section of the system separator from FIG. 10.

In FIG. 19, the inlet section 25 is shown again. In accordance with the design shown in FIG. 7, this has an inner circumferential groove 38 into which the screen 31 (see, for example, FIG. 11) can be inserted. Axial grooves 39 are also provided accordingly.

Figure 20:
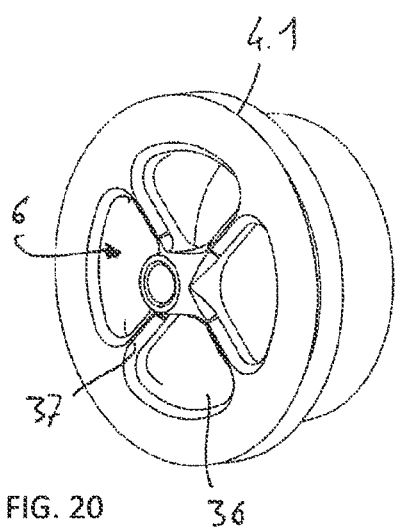
FIG. 20 shows a perspective view of the primary valve disk of the system separator from FIG. 10.

FIG. 20 again shows the primary valve disk 4.1 with spokes 37 and openings 36 forming the internal flow conduit 6.

Figure 21:
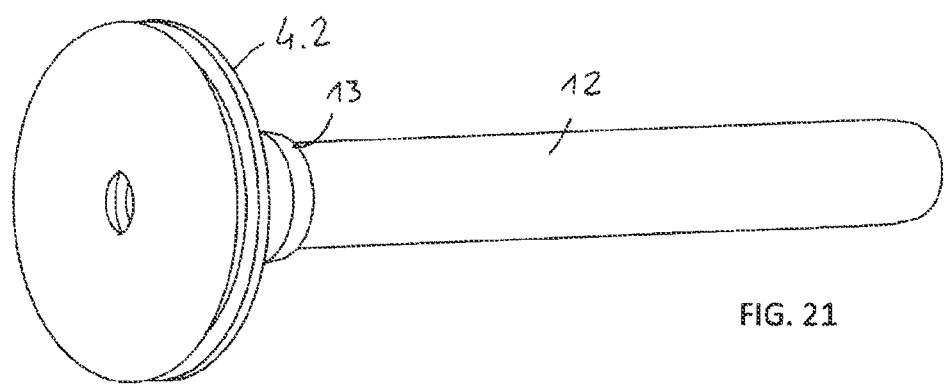
FIG. 21 shows a perspective view of the secondary valve disk.

FIG. 21 shows the secondary valve disk 4.2 with the sleeve 12, which on the one hand forms the discharge-outlet valve body and on the other hand comprises the second collar 13.

Figure 22:
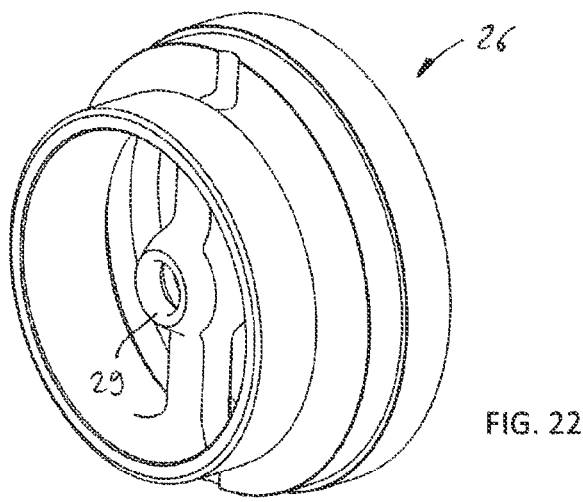
FIG. 22 shows bearing rim for the valve rod of the system separator from FIG. 10 in an oblique view from behind.
Figure 23:
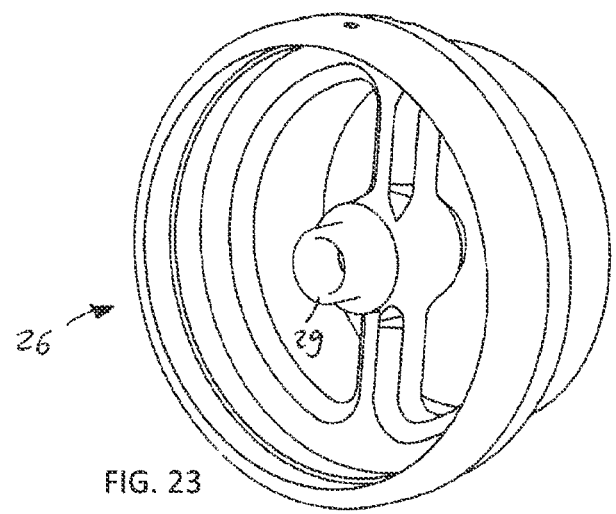
FIG. 23 shows the bearing rim from FIG. 22 in an oblique view from the front.

From FIGS. 22 and 23, the outlet part 26 can again be removed, with the outlet 21 in the radial struts (see, for example, FIGS. 10 and 11).

Figure 25:
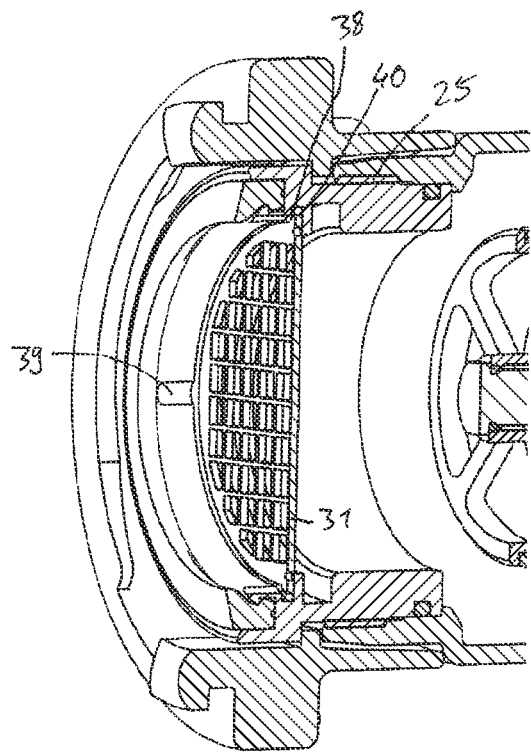
FIG. 25 shows the inlet section of the system separator from FIG. 10 with an inserted screen.
Figure 26:
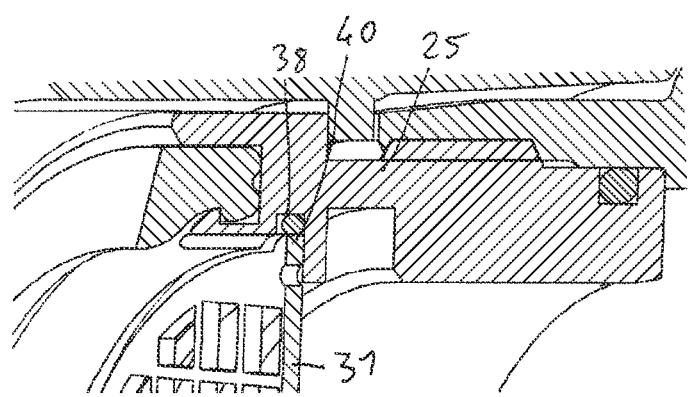
FIG. 26 shows an enlarged view of the area in which the screen is held in the inlet section.

FIGS. 25 and 26 again show details of how the screen 31 with its radial projections 40 is inserted into the circumferential groove 38 of the inlet section 25. Radially inside the radial projections 40, markings are provided, here in the form of bores, which mark the position of the radial projections 40 in the locked state of the screen 31, in which the radial projections 40 are offset in the circumferential direction relative to the axial grooves 39, so that they are visible from the outside. These markings/drillings can also be seen in FIG. 7.

LIST OF REFERENCE NUMERALS

1 Housing
2 Main flow conduit
3 Valve seat
4 Valve body
4.1 Primary valve disk
4.2 Secondary valve disk
5 Spring element
6 Inner flow conduit
7 Valve-body valve seat
8 Outer flow conduit
9 Valve rod
10 First collar
11 First stop
12 Sleeve
13 Second collar
14 Second stop
15 Longitudinal axis
16 Inlet
17 Outlet
18 Fire-fighting connection coupling
18.1 Rotatable lug part
18.2 Lugs
19 Fire-fighting fixed coupling
19.1 Lugs
20 Bearing cross
21 Discharge outlet
22 Sliding sleeve
23 Sealed longitudinal section
24 Discharge conduit
25 Inlet section
26 Outlet part
27 Screws
28 O-ring
29 Ring
30 Radial bore
31 Screen
32 Thread
33 Stop
34 Stop
35 Projection
36 Opening
37 Spoke
38 Circumferential groove
39 Axial groove
40 Radial projection
41 Center part
42 Threaded hole
43 Screw
44 Reflection ring

The invention claimed is:

1. A system separator comprising:
a backflow preventer including:
a housing enclosing a main flow conduit;
a valve seat inside the housing on the main flow conduit;
a valve body movable relative to the valve seat to close off the main flow conduit together with the valve seat in a closed position and to release the main flow conduit in an open position;
wherein the valve body is alternately movable between the closed position and the open position by at least one of a pressure difference in the main flow conduit or a force of a spring element;
wherein the main flow conduit is divided in an area of the valve body into at least one outer flow conduit and one inner flow conduit, and the valve body encloses the inner flow conduit and forms at least one valve-body valve seat on the inner flow conduit and comprises at least one primary and one secondary valve disk, wherein the valve body comprises a valve rod carrying the primary valve disk and on which the secondary valve disk is slidably positioned;
wherein the primary and secondary valve disks are arranged in such a way that in the closed position the primary valve disk is in sealing contact with the valve seat on the main flow conduit and the secondary valve disk is in sealing contact with the valve-body valve seat on the inner flow conduit, and in the open position the primary valve disk is lifted off the valve seat on the main flow conduit and releases the outer flow conduit, and the secondary valve disk is lifted off the valve-body valve seat on the inner flow conduit and releases the inner flow conduit;
wherein in addition to an inlet and an outlet, a discharge outlet is provided in the housing, which is connected to the outlet in a flow-conducting manner in the closed position of the valve body and is sealed with respect to the main flow conduit in the open position of the valve body;
wherein the valve rod is mounted in a bearing support having one or more radial struts in the main flow conduit, and wherein the discharge outlet is provided in the one or more radial struts of the bearing support.

2. The system separator according to claim 1, wherein the valve rod or a sleeve connected to the secondary valve disk and sliding on the valve rod forms a discharge-outlet valve body for closing the discharge outlet.

3. The system separator according to claim 2, wherein the inner surface of the housing is free of pointed edges in a section along which the discharge-outlet valve body slides.

4. The system separator according to claim 1, wherein the discharge outlet is provided in an outlet part of the backflow preventer housing.

5. The system separator according to claim 4, wherein the outlet part is connected to an inlet section of the housing via a center part.

6. The system separator according to claim 5, wherein the inlet section forms the valve seat.

7. The system separator according to claim 1, wherein the discharge outlet is covered in the radial direction at a distance by an axial projection.

8. The system separator according to claim 1, wherein a screen covering the main flow conduit is provided in the region of the inlet, which screen is inserted into a radially inner circumferential groove of the housing, including an inlet section of the housing mounted at least indirectly on an outlet part, and is held in a form fit which can be released by rotation of the screen.

9. The system separator according to claim 8, wherein adjacent to the circumferential groove in the housing, including the inlet section, a plurality of axial grooves arranged at a distance from one another over the circumference is provided and the screen has at least one radial projection of opposite shape to the axial grooves, by means of which it can be pushed into the circumferential groove via at least one axial groove and can be locked in the circumferential groove by twisting.

10. The system separator according to claim 1, wherein the valve rod or the primary valve disk has a first collar with which it abuts against a first stop on the housing in the open position, and the secondary valve disk or a sleeve connected thereto and sliding on the valve rod has a second collar with which it abuts against a second stop in the housing or on the valve rod in the open position.

11. The system separator according to claim 1, wherein the housing extends tubularly along a longitudinal axis from an inlet to an outlet and the valve body, including the primary and secondary valve disks is displaceable along the longitudinal axis and extends concentrically to the longitudinal axis.

12. The system separator according to claim 11, wherein the housing is provided with a fire-fighting coupling at the inlet and at the outlet, including at the inlet with a fire-fighting connection coupling with a rotatable lug part and at the outlet with a fire-fighting fixed coupling.

13. The system separator according to claim 12, wherein the housing is designed at the inlet with a Storz-B coupling and the housing over its entire axial length has an outer diameter which is smaller than the outer diameter of the fire-fighting couplings.

14. The system separator according to claim 1, wherein the valve seat and/or the valve-body valve seat is/are formed by a radially inwardly directed circumferential surface.

15. A system separator comprising:
a backflow preventer including:
a housing enclosing a main flow conduit;
a valve seat inside the housing at the main flow conduit;
a valve body movable relative to the valve seat to close off the main flow conduit together with the valve seat in a closed position and to release the main flow conduit in an open position;
wherein the valve body is alternately movable between the closed position and the open position by at least one of a pressure difference in the main flow conduit or by a force of a spring element, wherein the valve body comprises a valve rod carrying a valve disk;
wherein in addition to an inlet and an outlet, a discharge outlet is provided in the housing, which in the closed position of the valve body is connected to the outlet in a flow-conducting manner and in the open position of the valve body is sealed with respect to the main flow conduit;
wherein the valve rod is mounted in a bearing support having one or more radial struts in the main flow conduit, and the discharge outlet is provided in the one or more radial struts of the bearing support, and the valve rod or a sleeve sliding on the valve rod connected to the valve body forms a discharge-outlet valve body for closing the discharge outlet.

* * * * *